Jan. 19, 1965  I. R. LOSS  3,166,381
AIR FEED SYSTEM
Filed Dec. 26, 1961
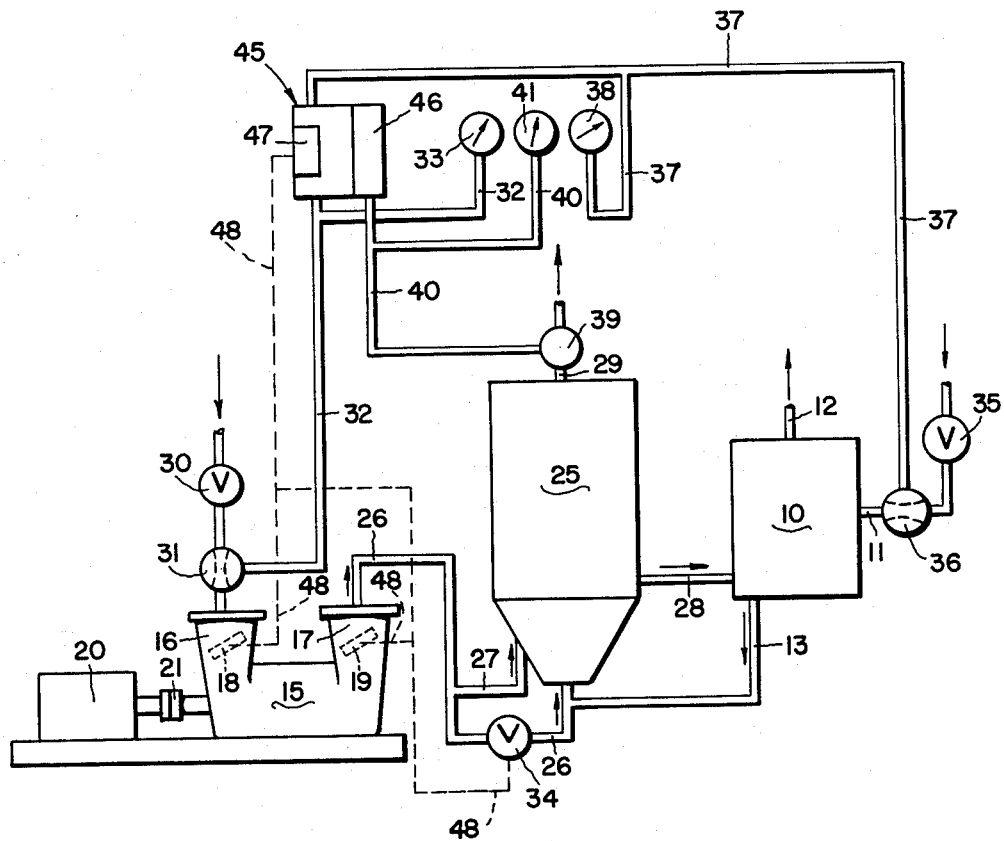
INVENTOR
*ISIDOR R. LOSS*
BY
HIS AGENT

United States Patent Office 3,166,381
Patented Jan. 19, 1965

3,166,381
AIR FEED SYSTEM
Isidor R. Loss, Phillipsburg, N.J., assignor to Ingersoll-Rand Company, New York, N.Y., a corporation of New Jersey
Filed Dec. 26, 1961, Ser. No. 162,121
7 Claims. (Cl. 23—288)

This invention relates to catalysis and more particularly to controls for catalytic cracking units.

Catalysis is a process used in the petroleum industry primarily for obtaining automotive and aviation gasolines, and industrial fuel oil from gas oil. In this process, gas oil is fed into a reactor where it is controllably heated beyond the boiling points of the various hydrocarbon molecules of such gas oil. Such heating is done under pressure, in the presence of a catalyst, and in the absence of oxygen, and results in the vaporization of the gas oil. The resulting vaporized hydrocarbons are then fed to a fractionizer or distillation tower.

The spent catalyst is exhausted from the reactor to be replaced or regenerated, however, regenerated catalysts are almost universally used in such catalytic cracking units and such regeneration is accomplished in thermal regenerators which normally use air as a catalyst carrier, and further require air for combustion. With the elevated temperatures present, extreme care and control of the air, provided to such regenerators by blowers, are required.

At the present time, a catalytic cracking unit normally includes means for indicating the input flow of gas oil to the reactor and the input air flow to the blower which are continually monitored during operation of the cracking unit. Inasmuch as the air is used in the regenerator and for the catalyst which is itself used at a rate dependent on the amount of gas oil that is processed, the air flow rate has a predetermined relationship with the gas oil flow rate. Thus, manual controls are provided to control the rate of air flow. However, oxygen in the regenerator exhaust gas is the critical factor and is normally controlled within three tenths of one percent. While the gas oil and air flow indicators with the manual controls are used toward this end, most catalytic cracking units also include an analyzer for the regenerator exhaust gas that is continuously monitored with the inlet flow indicating means.

Naturally, in view of the foregoing, it can be readily seen that constant surveillance of the indicating means is required and accurate adjustments of the manual controls must be made throughout the entire operating period of the catalytic cracker.

Accordingly, it is an object of this invention to provide an automatically controlled system for providing air to a catalytic cracking unit.

Another object of this invention is to provide an air feed system for a catalytic cracking unit which requires only periodic monitoring.

And, another object of this invention is to provide an air feed system for a catalytic cracking unit that is automatically controlled in response to inlet sensing means.

Still, another object of this invention is to provide an air feed system for a catalytic cracking unit that is automatically controlled in response to exhaust sensing means.

And still, another object of this invention is to provide an air feed system for a catalytic cracking unit that is automatically controlled in response to inlet sensing means and can be automatically overridden in response to exhaust sensing means.

This invention contemplates an automatic air feed system for cracking units having a reactor using a catalyst to crack gas oil that it receives, and a regenerator that receives spent catalyst and returns regenerated catalyst to the reactor. The air feed system has a blower connected to the regenerator to provide air as a catalyst carrier and for combustion, and valve means for controlling the flow of such air. Sensing means measures the inlet flow rate of the gas oil and air, and provides signals to a controller for the valve means to automatically control the air flow. An analyzer may sense the regenerator exhaust gases and provide signals to override the automatic controller response to signals representing inlet flow.

The foregoing and other objects and advantages of the invention will appear more fully hereinafter from a consideration of the detailed description which follows, taken together with the accompanying drawing wherein one embodiment of the invention is illustrated by way of example. It is expressly understood, however, that the drawing is for illustration purposes only and is not to be construed as defining the limits of the invention.

The single figure of the drawing is a diagrammatic illustration of an automatic air feed system in accordance with the invention that is operatively connected to a reactor and to a regenerator of a catalytic cracking unit.

Referring now to the drawings, a catalytic cracking unit has a reactor 10 for cracking gas oil received at its inlet 11. The reactor 10 has a discharge 12 for the vaporized gas oil which then goes to a fractionator or distilling tower (not shown), and an outlet 13 for spent catalyst.

A blower 15 has an inlet 16 to receive air and an outlet 17 for the air that is connected to an inlet line 26 of a regenerator 25. The blower 15 is driven by a motor or turbine 20 through a coupling 21.

A discharge line 13 of reactor 10 is connected to the inlet line 26 so air flow therethrough carries the spent catalyst to the regenerator 25. The regenerator 25 has a second inlet line 27 which may be a spur of inlet line 26, as shown, to provide air for combustion.

The regenerator 25 has a discharge line 28 connected to the reactor 10 to return regenerated catalyst thereto for re-use and a second discharge line 29 for waste gas. Although not shown, line 29 may be connected to discharge exhaust gas from the regenerator 25 to atmosphere through a boiler to utilize the heat of combustion, and through filters for removal of atmosphere contaminates.

Now, in accordance with the invention, a control and monitoring system is provided in which the signal and the control carriers may be mechanical, electrical, or fluid flows. In addition manual controls are included to turn the air delivery system and the cracking unit off, and for emergencies should the automatic controls fail.

Accordingly, a manual valve 30 and a flow meter or sensing device 31 are connected in series in an inlet line connected to the inlet 16 of blower 15 that may have an inlet valve 18. Blower 15 may have a valve 19 in the blower outlet 17 to control the flow of air to the regenerator 25, or a corresponding valve (not shown) may be provided in line 26. At the same time, a valve 34 may be provided in inlet line 26, downstream of spur inlet line 27, that can close line 26 but not affect minimum air flow through line 27 to maintain combustion in regenerator 25. Sensing device 31 has a connecting line 32 to an indicating means 33 and to an automatic control device 45 for providing a signal representing inlet air flow.

A manual control valve 35 and a flow meter or sensing device 36 are connected in series in the inlet line 11 of reactor 10. The sensing device 36 has a connecting line 37 to an indicating means 38 and to the automatic control device 45 for providing a signal representing gas oil inlet flow.

An exhaust gas analyzer 39 is disposed in exhaust line 29 of the regenerator 25 and has a connecting line 40 to an indicator 41 and to an override section 46 of the automatic control device 45 to provide a signal representing the oxygen content of the regenerator exhaust gas.

The automatic control device 45 has a proportioning means 47 which can be adjusted to regulate valves 18, 19, and/or 34 through control connections 48 to provide a predetermined desired air inlet flow to blower 15 in accordance with determined gas oil inlet flow. Although not shown, air flow may be controlled by controlling the speed of the motor or turbine 20, or by controlling coupling 20 which would then be of the form of an adjustable speed transmission.

With indicators 33 and 38 indicating inlet air flow and inlet gas oil flow, respectively, and indicator 41 indicating the oxygen content of the exhaust gas from regenerator 25, the device can be periodically checked for malfunctions. Similarly, with the override 46 that is responsive to signals from exhaust gas analyzer 39, any variations or changes occurring in the system, such as partial blockage of the catalyst flow, will override the response of the controller 45 and readjust the air flow controls.

In operation, with manual valves 30 and 35 open and motor or turbine 20 driving blower 15, sensors or sensing devices 31 and 36 provide signals to the controller 45 and to the indicators 33 and 38 that represent air and gas oil inlet flow, respectively. With the proportioning section 47 preadjusted, controller 45 simultaneously adjusts valves 18 and 19, or either of the valves where only one is included in the system, to provide desired air flow to the regenerator 25 through lines 26 and 27. Valve 34, when provided in the system, is simultaneously adjusted with valves 18 and 19 to provide further control of the air flow through line 26 independent of the flow through line 27.

The analyzer 39 determines the extent of oxygen present in the gas exhausted from regenerator 25 through line 29, and provides representative signals to indicator 41 and to override 46. Where a discrepancy exists between the valve setting in accordance with inlet flow and signals received by override 46, controller 45 readjusts valves 18, 19 and/or 34 as provided in accordance with the override signals.

Indicators 33, 38 and 41 provide visual signals that are periodically monitored, and where indications show unsafe or undesirable operating conditions, manual valves 30 and 35 are adjusted accordingly. The manual valves 30 and 35 are closed to terminate operation of the apparatus.

Thus, it should be readily seen that the foregoing provides an air feed system for catalytic cracking apparatus that is automatically controlled with respect to inputs, has an automatic override control with respect to exhaust, and has visual indicating means that is periodically monitored with manual control means for adjustments in accordance with such monitoring.

Although but a single embodiment of the invention has been illustrated and described in detail, it is to be understood that the invention is not limited thereto. Various changes may also be made in the design and arrangement of the parts without departing from the spirit and scope of the invention as will now be understood by those skilled in the art.

I claim:

1. In a catalyst cracking unit including a reactor with an inlet adapted to receive gas oil to be cracked in the presence of a catalyst, and a regenerator with an inlet connection from the reactor for receiving spent catalyst, an exhaust outlet and an outlet connection to the reactor for providing catalyst thereto, an air feed system comprising:
   (a) a blower having an inlet adapted to receive air, and an outlet connected to the regenerator for providing air for combustion and to the regenerator inlet for providing air for carrying spent catalyst;
   (b) means connected to the blower for controlling air flow;
   (c) means connected to the reactor inlet and to the blower inlet for sensing gas oil flow and air flow, and for providing signals representing each of such flows;
   (d) an automatic controller connected to the sensing means and to the flow control means for controlling air flow in accordance with signals from the sensing means;
   (e) means connected to the regenerator exhaust outlet for analyzing the oxygen content of regenerator exhaust, and for providing signals representing such oxygen content; and
   (f) means connected to the controller and to the analyzing means for overriding the controller response to signals representing gas oil flow and air flow to control air flow in accordance with regenerator exhaust oxygen content.

2. In a catalyst cracking unit including a reactor with an inlet adapted to receive gas oil to be cracked in the presence of a catalyst, and a regenerator with an inlet connection from the reactor for receiving spent catalyst, an exhaust outlet and an outlet connection to the reactor for providing catalyst thereto, an air feed system comprising:
   (a) a blower having an inlet adapted to receive air, and an outlet connected to the regenerator for providing air for combustion and to the regenerator inlet for providing air for carrying spent catalyst;
   (b) means connected to the blower for controlling air flow;
   (c) means connected to the reactor inlet and to the blower inlet for sensing gas oil flow and air flow, and for providing signals representing each of such flows;
   (d) an automatic controller connected to the sensing means and to the flow control means for controlling air flow in accordance with signals from the sensing means;
   (e) means connected to the regenerator exhaust outlet for analyzing oxygen content of regenerator exhaust, and for providing signals representing such oxygen content;
   (f) means connected to the controller and to the analyzing means for overriding the controller response to signals representing gas oil flow and air flow to control air flow in accordance with regenerator exhaust oxygen content; and
   (g) a valve connecting the blower exhaust to the regenerator inlet and being connected to the automatic controller for varying the flow of catalyst carrier air simultaneously with air flow control by the flow control means connected to the blower.

3. In a catalyst cracking unit including a reactor with an inlet adapted to receive gas oil to be cracked in the presence of a catalyst, and a regenerator with an exhaust outlet and an inlet connection to the reactor for receiving spent catalyst therefrom, an air feed system comprising:
   (a) a blower having an inlet adapted to receive air and an outlet for such air;
   (b) the blower outlet having a first connection to the regenerator for providing air for combustion and a second connection to the regenerator for providing air as a catalyst carrier;
   (c) the second blower outlet connection being connected to the reactor for receiving spent catalyst to be carried;
   (d) means connected to the blower for controlling air flow;
   (e) means connected to the reactor inlet for sensing flow of gas oil and for providing signals representing such flow;
   (f) means connected to the blower inlet for sensing air flow and for providing signals representing such flow;
   (g) a signal responsive controller connected to both sensing means for receiving signals therefrom and being connected to the flow control means to control air flow in accordance with signals representing gas oil flow and air flow;

(h) means connected to the regenerator exhaust outlet for analyzing the oxygen content of regenerator exhaust, and for providing signals representing such oxygen content; and (i) means connected to the controller and to the analyzing means for overriding the controller response to signals representing gas oil flow and air flow to control air flow in accordance with regenerator exhaust oxygen conent.

4. In a catalyst cracking unit including a reactor with an inlet adapted to receive gas oil to be cracked in the presence of a catalyst, and a regenerator with an exhaust outlet and an inlet connection to the reactor for receiving spent catalyst therefrom, an air feed system comprising:

(a) a blower having an inlet adapted to receive air and an outlet for such air;

(b) the blower outlet having a first connection to the regenerator for providing air for combustion and a second connection to the regenerator for providing air as a catalyst carrier;

(c) the second blower outlet connection being connected to the reactor for receiving spent catalyst to be carried;

(d) means connected to the blower for controlling air flow;

(e) means connected to the reactor inlet for sensing flow of gas oil and for providing signals representing such flow;

(f) means connected to the blower inlet for sensing air flow and for providing signals representing such flow;

(g) a signal responsive controller connected to both sensing means for receiving signals therefrom and being connected to the flow control means to control air flow in accordance with signals representing gas oil flow and air flow;

(h) means connected to the regenerator exhaust outlet for analyzing the oxygen content of regenerator exhaust and for providing signals representing such oxygen content;

(i) means connected to the controller and to the analyzing means for overriding the controller response to signals representing gas oil flow and air flow to control air flow in accordance with regenerator exhaust oxygen content; and (j) valve means connected in the second blower outlet connection being connected to the controller for varying catalyst carrier air flow simultaneously with air flow control by the flow control means connected to the blower.

5. In a catalyst cracking unit including a reactor with an inlet adapted to receive gas oil to be cracked in the presence of a catalyst, and a regenerator with an exhaust outlet and an inlet connection to the reactor for receiving spent catalyst therefrom, an air feed system comprising:

(a) a blower having an inlet adapted to receive air and an outlet for such air;

(b) the blower outlet having a first connection to the regenerator for providing air for combustion and a second connection to the regenerator for providin air as a catalyst carrier;

(c) the second blower outlet connection being connected to the reactor for receiving spent catalyst to be carried;

(d) means connected to the blower for controlling air flow;

(e) means connected to the reactor inlet for sensing flow to control air flow in accordance with regenering such flow;

(f) means connected to the blower inlet for sensing air flow and for providing signals representing such flow;

(g) a signal responsive controller connected to both sensing means for receiving signals therefrom and being connected to the flow control means to control air flow in accordance with signals representing gas oil flow and air flow;

(h) means connected to the regenerator exhaust outlet for analyzing the oxygen content of regenerator exhaust, and for providing signals representing such oxygen content;

(i) means connected to the controller and to the analyzing means for overriding the controller response to signals representing gas oil flow and air flow to control air flow in accordance with regenerator exhaust oxygen content;

(j) valve means connected in the second blower outlet connection being connected to the controller for varying catalyst carrier air flow simultaneously with air flow control by the flow control means connected to the blower;

(k) a plurality of indicators one of which is connected to the analyzing means and to each of the sensing means for visually presenting the signals representing regenerator exhaust oxygen content, gas oil flow, and air flow; and (l) and a pair of valves one being connected to the reactor inlet and the other being connected to the blower inlet for manually controlling gas oil flow and air flow when the indicators present undesirable readings.

6. In a catalyst cracking unit including a reactor with an inlet adapted to receive gas oil to be cracked in the presence of a catalyst, and a regenerator with an exhaust outlet and an inlet connection to the reactor for receiving spent catalyst therefrom, an air feed system comprising:

(a) a blower having an inlet adapted to receive air and an outlet for such air;

(b) the blower outlet having a first connection to the regenerator for providing air for combustion and a second connection to the regenerator for providing air as a catalyst carrier;

(c) the second blower outlet connection being connected to the reactor for receiving spent catalyst to be carried;

(d) a valve disposed in the blower inlet for controlling air flow;

(e) means connected to the reactor inlet for sensing flow of gas oil and for providing signals representing such flow;

(f) means connected to the blower inlet for sensing air flow and for providing signals representing such flow;

(g) a signal responsive controller connected to both sensing means for receiving signals therefrom and being connected to the valve disposed in the blower inlet to control air flow in accordance with signals representing gas oil flow and air flow;

(h) means connected to the regenerator exhaust outlet for analyzing the oxygen content of regenerator exhaust, and for providing signals representing such oxygen content;

(i) means connected to the controller and to the analyzing means for overriding the controller response to signals representing gas oil flow and air flow to control air flow in accordance with regeneator exhaust oxygen content; and (j) valve means connected in the second blower outlet connection being connected to the controller for varying catalyst carrier air flow simultaneously with air flow control by the valve disposed in the blower inlet.

7. In a catalyst cracking unit including a reactor with an inlet adapted to receive gas oil to be cracked in the presence of a catalyst, and a regenerator with an exhaust outlet and an inlet connection to the reactor for receiving spent catalyst therefrom, an air feed system comprising:

(a) a blower having an inlet adapted to receive air and an outlet for such air;

(b) the blower outlet having a first connection to the regenerator for providing air for combustion and a second connection to the regenerator for providing air as a catalyst carrier;

(c) the second blower outlet connection being connected to the reactor for receiving spent catalyst to be carried;

(d) a valve disposed in the blower outlet for controlling air flow;

(e) means connected to the reactor inlet for sensing flow of gas oil and for providing signals representing such flow;

(f) means connected to the blower inlet for sensing air flow and for providing signals representing such flow;

(g) a signal responsive controller connected to both sensing means for receiving signals therefrom and being connected to the valve disposed in the blower outlet to control air flow in accordance with signals representing gas oil flow and air flow;

(h) means connected to the regenerator exhaust outlet for analyzing the oxygen content of regenerator exhaust and for providing signals representing such oxygen content;

(i) means connected to the controller and to the analyzing means for overriding the controller response to signals representing gas oil flow and air flow to control air flow in accordance with regenerator exhaust oxygen content; and (j) valve means connected in the second blower outlet connection being connected to the controller for varying catalyst carrier air flow simultaneously with air flow control by the valve disposed in the blower outlet.

References Cited in the file of this patent

UNITED STATES PATENTS

| | | |
|---|---|---|
| 2,073,650 | Prickett | Mar. 16, 1937 |
| 2,211,211 | Kassel | Aug. 13, 1940 |
| 2,298,399 | McAfee | Oct. 13, 1942 |
| 2,436,041 | Gerhold et al. | Feb. 17, 1948 |
| 2,476,280 | Bragg et al. | July 19, 1949 |
| 2,487,717 | Maker et al. | Nov. 8, 1949 |
| 2,709,678 | Berger | May 31, 1955 |
| 2,788,264 | Bremer et al. | Apr. 9, 1957 |
| 2,905,630 | Nicolai et al. | Sept. 22, 1959 |
| 3,012,962 | Dygert | Dec. 12, 1961 |